(12) United States Patent
Elsner et al.

(10) Patent No.: US 6,620,906 B1
(45) Date of Patent: Sep. 16, 2003

(54) METHOD FOR THE PRODUCTION OF HIGHLY PURE POLYCARBONATE AND ULTRAPURE POLYCARBONATE

(75) Inventors: Thomas Elsner, Düsseldorf (DE); Jürgen Heuser, Krefeld (DE); Christian Kords, Krefeld (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 10/182,964

(22) PCT Filed: Jan. 25, 2000

(86) PCT No.: PCT/EP01/00808
§ 371 (c)(1),
(2), (4) Date: Aug. 2, 2002

(87) PCT Pub. No.: WO01/58984
PCT Pub. Date: Aug. 16, 2001

(30) Foreign Application Priority Data
Feb. 7, 2000 (DE) .......................................... 100 05 151

(51) Int. Cl.⁷ ............................................... C08G 64/00

(52) U.S. Cl. .................... 528/481; 264/176.1; 264/219; 264/330; 359/642; 524/127; 525/64; 525/67; 525/148; 525/462; 525/464; 528/196; 528/198; 528/480; 528/499; 528/502; 528/503

(58) Field of Search ........................ 264/176.1; 525/67, 525/148, 64, 464, 462; 524/127; 528/196, 198, 480, 481, 499, 502, 503; 359/642

(56) References Cited

FOREIGN PATENT DOCUMENTS

| WO | 99/67002 | 12/1999 |
| WO | 00/07684 | 2/2000 |

OTHER PUBLICATIONS

Polymer Review, vol. ISX, (month unavailable) 1964, pp. 33–45, "Preparation of Aromatic Polycarbonates by Interfacial Polycondensation".

*Primary Examiner*—Terressa M. Boykin
(74) *Attorney, Agent, or Firm*—Joseph C. Gil; James R. Franks; John E. Mrozinski

(57) ABSTRACT

The present invention provides a polycarbonate having a low particle content, a process for producing high-purity polycarbonate and polycarbonate of maximum purity and molded products made from such polycarbonate.

15 Claims, 1 Drawing Sheet

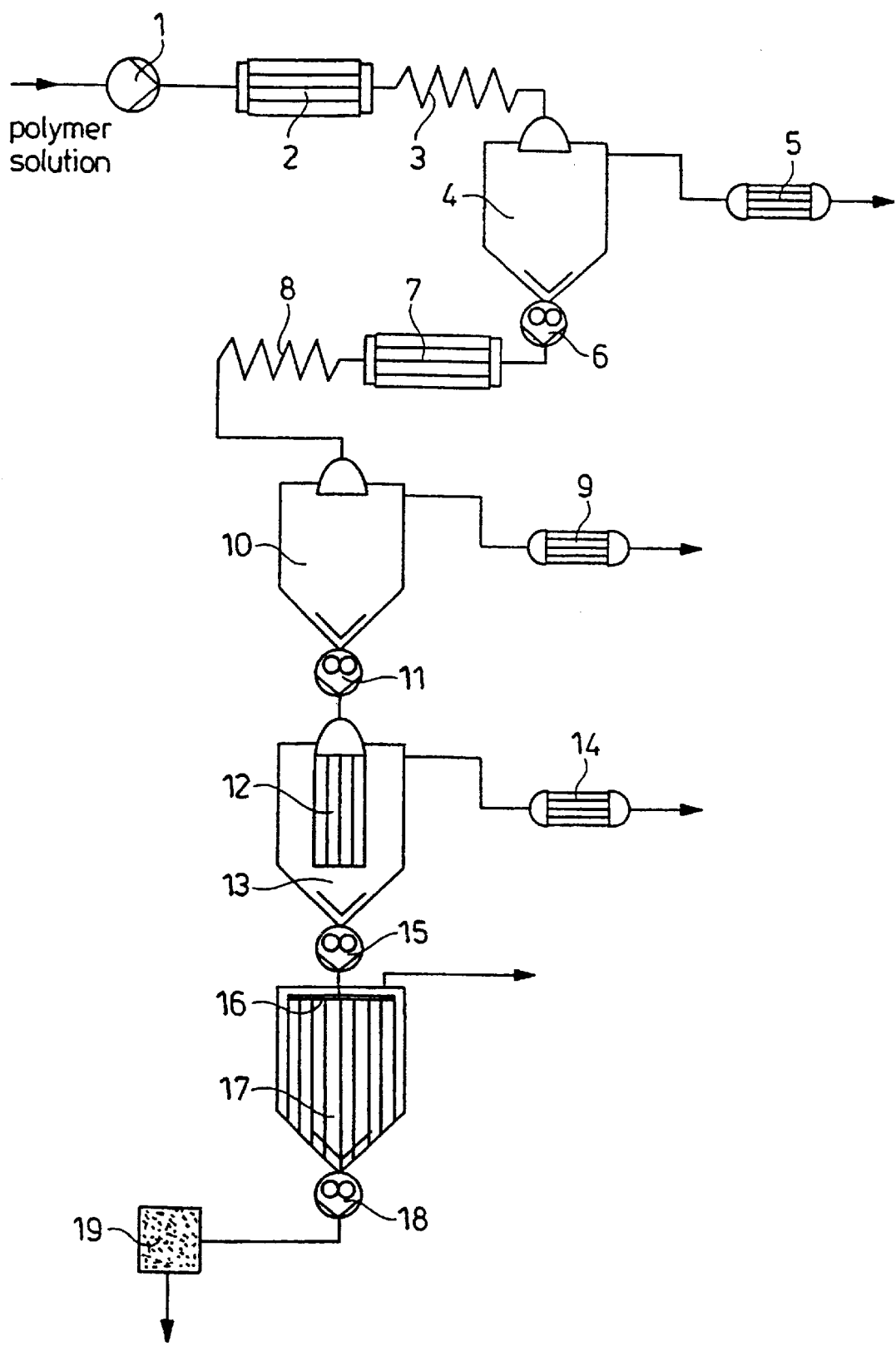

METHOD FOR THE PRODUCTION OF HIGHLY PURE POLYCARBONATE AND ULTRAPURE POLYCARBONATE

FIELD OF THE INVENTION

This invention relates to a polycarbonate having a low particle content and to a process for producing high-purity polycarbonate and polycarbonate of maximum purity produced therefrom as well as moulded products made from this polycarbonate.

BACKGROUND OF THE INVENTION

In order to produce polycarbonates by the so-called phase interface process, dihydroxydiarylalkanes in the form of their alkali metal salts are reacted with phosgene in heterogeneous phase in the presence of inorganic bases such as sodium hydroxide solution and of an organic solvent in which the product polycarbonate is readily soluble. During the reaction, the aqueous phase is distributed in the organic phase and after the reaction the organic, polycarbonate-containing phase is washed with an aqueous liquid, which is intended to remove inter alia electrolytes, and the washing liquid is then separated off.

Moulded products made of high-purity polycarbonates are used for optical and magneto-optical purposes, in particular in laser-readable data storage media. As the storage capacity of these media is being constantly enlarged, the demands placed on the purity of the polycarbonates used are also increasing.

DETAILED DESCRIPTION OF THE INVENTION

The object of the invention is to provide a process for removing volatile components from a polymer solution, in order to produce a high-purity polycarbonate having a particularly low particle content, which is particularly suitable as starting material for moulded products for data storage.

This object was achievable by the development and provision of the process according to the invention described in more detail below.

The invention firstly provides a process for producing polycarbonate by the phase interface process, in which the polycarbonate-containing solution is washed with an aqueous washing liquid, the washing liquid is separated off and the solvent is evaporated off and wherein the mixture of organic polycarbonate solution and residual washing liquid obtained after the separation of the washing liquid is heated by indirect heat exchange until a clear solution is attained and filtered in order to remove solid substances, wherein A) in an initial stage, in one or more individual steps, the solution, which has a polymer content of 5 to 20 wt. %, is concentrated to 60 to 75 wt. % at a temperature of 150° C. to 250° C. in a combination of a shell-and-tube heat exchanger and a film evaporator or a coiled-tube evaporator or in a shell-and-tube heat exchanger, in each case with downstream separator, the pressure in the separator being about 0.1 to 0.4 MPa, preferably ambient pressure (i.e. about 0.1 MPa), B) in a further stage, the solution is concentrated from 60 to 75 wt. % to at least 95 wt. %, in particular to 98 to 99.9 wt. %, at a temperature of 250° C. to 350° C., in a shell-and-tube heat exchanger with downstream separator, the shell-and-tube heat exchanger containing vertical, heated, straight tubes with or without incorporated static mixers, having an internal diameter of 5 to 30 mm, preferably of 5 to 15 mm, a length of 0.5 to 4 m, preferably of 1 to 2 m, and the throughput per heat-exchanger tube through the tubes being 0.5 to 10 kg/h, preferably 3 to 7 kg/h, based on the polymer, and the pressure in the separator being 0.5 kPa to 0.1 MPa, in particular 3 kPa to 0.1 kPa, preferably 3 kPa to 10 kPa, C) in a further stage, the solution containing remains of solvent and/or of volatile components is concentrated to a content of solvent and/or of other volatile components of 5 to 500 ppm, at a temperature of 250° C. to 350° C., in a further shell-and-tube heat exchanger with downstream separator or in an extruder-evaporator, the shell-and-tube heat exchanger containing vertical, heated, straight tubes having an internal diameter of 5 to 30 mm, preferably of 10 to 20 mm, a length of 0.2 to 2 m, preferably of 0.5 to 1 m, and the throughput per heat-exchanger tube through the tubes being 0.5 to 10 kg/h, preferably 3 to 7 kg/h, based on the polymer, and the pressure in the separator being 0.05 kPa to 0.1 MPa, in particular 0.1 kPa to 2 kPa, and D) the degassed polymer is subsequently isolated and optionally granulated.

According to the invention, the term "polymer" covers polycarbonates, in fact, both homopolycarbonates and copolycarbonates and mixtures thereof. The polycarbonates according to the invention can be aromatic polyester carbonates or polycarbonates in a mixture with aromatic polyester carbonates. The term "polycarbonate" is subsequently used in place of the previously mentioned polymers.

The polycarbonate according to the invention is obtained by the so-called phase interface process (H. Schnell, "Chemistry and Physics of Polycarbonates", Polymer Review, Vol. IXS, 22 ff., Interscience Publishers, New York 1964), in which the polycarbonate-containing solution is subsequently washed with a washing liquid, the washing liquid is separated off and the solution is evaporated off. According to the invention, this process is carried out in the stages described.

Compounds preferably used as starting compounds according to the invention are bisphenols corresponding to the general formula HO—Z—OH, wherein Z is a divalent organic group having 6 to 30 carbon atoms, which contains one or more aromatic groups. Examples of such compounds are bisphenols, which belong to the group comprising dihydroxydiphenyls, bis(hydroxyphenyl)alkanes, indane bisphenols, bis(hydroxyphenyl) ethers, bis(hydroxyphenyl) sulfones, bis(hydroxyphenyl) ketones and $\alpha,\alpha'$-bis(hydroxyphenyl)diisopropylbenzenes.

Particularly preferred bisphenols, which belong to the above-mentioned groups of compounds, are 2,2-bis(4-hydroxyphenyl)propane (bisphenol A), tetraalkylbisphenol A, 4,4-(meta-phenylenediisopropyl)diphenol (bisphenol M), 1,1-bis(4-hydroxyphenyl)-3,3,5-trimethylcyclohexanone as well as optionally mixtures thereof. Particularly preferred copolycarbonates are those based on the monomers bisphenol A and 1,1-bis(4-hydroxyphenyl)-3,3,5-trimethylcyclohexanone. The bisphenol compounds to be used according to the invention are reacted with compounds of carbonic acid, in particular phosgene.

The polyester carbonates according to the invention are obtained by reaction of the bisphenols already mentioned above, at least one aromatic dicarboxylic acid and optionally carbonic acid. Suitable aromatic dicarboxylic acids are, for example, orthophthalic acid, terephthalic acid, isophthalic acid, 3,3'- or 4,4'-diphenyldicarboxylic acid and benzophenonedicarboxylic acids.

Inert organic solvents used in the process are preferably dichloromethane or mixtures of dichloromethane and chlorobenzene.

The reaction can be accelerated by catalysts, such as tertiary amines, N-alkylpiperidines or onium salts. Preferably tributylamine, triethylamine and N-ethylpiperidine are used. A monofunctional phenol, such as phenol, cumylphenol, p-tert. butylphenol or 4-(1,1,3,3-tetramethylbutyl)phenol can be used as a chain stopper and molar mass controller. Isatinbiscresol, for example, can be used as branching agent.

To produce high-purity polycarbonates according to the invention, the bisphenols are dissolved in aqueous alkaline phase, preferably sodium hydroxide solution. The chain stoppers optionally required for the production of copolycarbonates are dissolved in quantities of 1.0 to 20.0 mol. % per mol bisphenol in the aqueous alkaline phase or added to the latter in solid form in an inert organic phase. Then phosgene is introduced into the mixer containing the other reaction components and the polymerisation is carried out.

A part, up to 80 mol. %, preferably from 20 to 50 mol. %, of the carbonate groups in the polycarbonates can be replaced by aromatic dicarboxylic ester groups.

In a further development of the invention, the thermoplastic polycarbonates have average molecular weights $M_w$ and a foreign particle index of less than $2.5 \cdot 10^4 \, \mu m^2/g$. The sodium content is preferably less than 30 ppb, measured by atomic absorption spectroscopy.

During the reaction, the aqueous phase is emulsified in the organic phase. In the course of this, droplets of differing size are formed. After the reaction, the organic phase containing the polycarbonate is generally washed several times with an aqueous liquid and after each washing process is as far as possible separated from the aqueous phase. After it has been washed and the washing liquid removed, the polymer solution is cloudy. The washing liquid used comprises aqueous liquid for the separation of the catalyst, a dilute mineral acid such as HCl or $H_3PO_4$ and demineralised water for further purification. The concentration of HCl or $H_3PO_4$ in the washing liquid can be, for example, 0.5 to 1.0 wt. %.

The fundamentally known separatory vessels, phase separators, centrifuges or coalescers, or combinations of this equipment, can be used as phase-separating devices for the removal of the washing liquid from the organic phase.

The solvent is evaporated off in the described stages in order to obtain the high-purity polycarbonate.

Moulded products made from the high-purity polycarbonate according to the invention are in particular optical and magneto-optical data storage media such as mini disk, compact disk or digital versatile disk, optical lenses and prisms, glazing for motor vehicles and headlamps, other types of glazing, such as for greenhouses, so-called twin-wall sheets or double-walled sheets. These moulded products are manufactured by injection-moulding processes, extrusion processes and extrusion-blowing processes, using the polycarbonate according to the invention having the appropriate molecular weight.

The preferred molecular weight range for the data storage media is 12,000 to 22,000, for lenses and glazing is 22,000 to 32,000 and for sheets and double-walled sheets is 28,000 to 40,000. All the molecular weights given refer to the weight average of the molar mass.

The moulded products according to the invention optionally have a surface coating, for example, a scratch-resistant coating.

For the production of optical lenses and films or disks for magneto-optical data storage media, it is preferable to use the polycarbonates according to the invention having a molecular weight of 12,000 to 40,000, as a material which has a molar mass within this range is very easy to shape thermoplastically. The moulded products can be manufactured by injection-moulding processes. To this end, the resin is melted at temperatures of 300° C. to 400° C. and the mould is generally maintained at a temperature of 50° C. to 140° C.

For the production of, for example, a plate-like material for data storage, the high-purity polycarbonate body according to the invention is processed in suitable, known machines for the injection-moulding of plastics.

A stamper, which contains, in the form of small pits or indentations, the information which is subsequently to be stored on the compact disk, is first of all introduced into a side of a cavity of the injection mould. Polycarbonate granules from the hopper of a granulator are transferred into the plasticising unit of the machine for the injection-moulding of plastics. There the granules are melted by the shearing action of the rotating screw and the heating devices along the outer circumference of the plasticising cylinder. The melt passes along the rotating screw and through a back-flow valve into the space in front of the screw and drives the screw back as a result of the reaction forces thus arising. When the required quantity of plasticised material is present in front of the back-flow valve, the screw rotation and hence the transportation of the material is stopped. The screw is then moved axially forwards, the back-flow valve shuts and pushes the plasticised material into the cavity of the mould, where it cools down under decreasing pressure. The polycarbonate disk has a thickness, for example, of 0.5 to 3 mm.

After the solidification of the injected polycarbonate in the mould, the central hole of the compact disk is punched, the mould is then opened and the disk is taken out. The reflecting layer is applied by passing the perforated disk through a metallising plant. The metals are vaporised or sputtered onto the polycarbonate moulded product. Examples of suitable metals are aluminium, gold, silicon and the rare earths or a mixture of a transition metal, such as iron or cobalt, and a rare earth element, such as terbium, gadolinium, neodymium or dysprosium.

After the metallisation, the disk is passed to the coating unit, where the protective layer is applied. The protective layer is formed from a resin which is curable by electron beams or UV radiation, or from a silicone or ceramic material.

The following Examples serve to illustrate the process according to the invention.

EXAMPLE 1

A general example of the process is illustrated by the diagram of the procedure in FIG. 1. A pump 1, preferably a screw pump, delivers the 5 to 20% polymer solution in two stages through a combination of heat exchanger 2 and coiled-tube evaporator 3 into the bottom of a first separator 4. In the separator 4 the more volatile components are separated off and condensed in a condenser 5. A further pump, preferably gear pump 6, delivers the solution through a second heat exchanger 7, followed by a coiled-tube evaporator 8, with the separation of the volatile components in the condenser 9 in the separator 10.

A further gear pump 11 delivers the concentrated polymer solution (60 to 75 wt. % polymer) through a shell-and-tube heat exchanger 12 into the bottom of the third separator 13. The more volatile components are condensed in the condenser 14. A further gear pump 15 delivers the 95 to 99.9 wt. % polymer solution via a manifold 16, which produces a multiplicity of thin strands of polymer of 1 mm diameter, into the fourth separator 17. Here the more volatile components are removed under suction. The degassed polymer melt is passed via a gear pump 18 to a granulator 19.

A 15 wt. % polycarbonate solution obtained from a polycarbonate production process using BPA as polymer together with 42 wt. % chlorobenzene and 43 wt. % methylene chloride was concentrated by means of the procedure described above in four steps (corresponding to FIG. 1). In the first two stages, the polycarbonate solution was heated in the heat exchangers 2 and 7 to 170° C. and 220° C. respectively. The tubes of the heat exchangers 2, 7 were 10 mm in diameter and 4 m in length and were manufactured from Alloy 59 (heat exchanger 2) and Incolloy 686 (heat exchanger 7). The pressure was 0.14 MPa in the associated separator 4 and 0.35 MPa in the separator 22. The polymer solution leaving the separator 10 contained 65 wt. % polycarbonate.

In the third stage, the polycarbonate solution was heated to 300° C. in the shell-and-tube heat exchanger 12. The tubes were 10 mm in diameter and 2 m in length and were manufactured from Alloy 59. The throughput per tube was 5 kg/h. The pressure in the associated separator 13 was 0.1 MPa. The polymer solution leaving the second separator 13 contained 98.5 wt. % polycarbonate.

In the fourth stage, the polycarbonate solution was admitted into the separator 17 via a manifold 16 with 1 mm bores for the production of a multiplicity of polymer strands having a large surface area for the exchange of materials. The separator 17 and the tubing in contact with the product were manufactured from Alloy 59. The pressure in the fourth separator 17 was 0.1 kPa.

The degassed polycarbonate in the polymer melt leaving the fourth separator 17 had a content of volatile compounds and residual solvent (substantially chlorobenzene) of 50 ppm.

After leaving the fourth separator 17, the polycarbonate melt was processed directly into granules in a granulator 19. The polycarbonate granules had a solution viscosity of 1.29 (measured at 25° C. in methylene chloride at a concentration of 5 g/l).

The residual content of bisphenol A (BPA) in the granulated polycarbonate was approximately 5 ppm, measured by gas chromatography.

EXAMPLE 2

The sequence of process steps and the device used were the same as in Example 1, but the pressure in the separator 13 was lowered to 5 kPa.

With this measure, a granular polycarbonate having a residual content of BPA of only 2 ppm was obtained from the overall process. The chlorobenzene content was 50 ppm.

EXAMPLE 3

With the same procedure as in Example 2, but with a pressure of 3 kPa in the separator 13, a polycarbonate having a residual content of BPA of 1 ppm was obtained. The chlorobenzene content was 25 ppm.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. In a process for producing polycarbonate by the phase interface process, in which a polycarbonate-containing solution is washed with an aqueous washing liquid, the washing liquid is separated off and the solvent is evaporated off and wherein the mixture of organic polycarbonate solution and residual washing liquid obtained after the separation of the washing liquid is heated by indirect heat exchange until a clear solution is attained and filtered in order to remove solid substances, the improvement comprising:

concentrating the organic polycarbonate solution, which has a polymer content of from 5 to 20 wt. % to 60 to 75 wt. % at a temperature of 150° C. to 250° C. in a combination of a first shell-and-tube heat exchanger and a film evaporator or a coiled-tube evaporator or in a first shell-and-tube heat exchanger, in each case with downstream separator, the pressure in the separator being about 0.1 to 0.4 Mpa;

concentrating the organic polycarbonate solution from 60 to 75 wt. % to at least 95 wt. % at a temperature of 250° C. to 350° C., in a first or second shell-and-tube heat exchanger with downstream separator, the first or second shell-and-tube heat exchanger containing vertical, heated, straight tubes with or without incorporated static mixers, having an internal diameter of 5 to 30 mm, a length of 0.5 to 4 m, and the throughput per heat-exchanger tube through the tubes being 0.5 to 10 kg/h based on the polymer, and the pressure in the separator being 0.5 kPa to 0.1 Mpa;

concentrating the organic polycarbonate solution containing remains of solvent and/or of volatile components to a content of solvent and/or of other volatile components of 5 to 500 ppm, at a temperature of 250° C. to 350° C., in a second or third shell-and-tube heat exchanger with downstream separator or in an extruder-evaporator, the second or third shell-and-tube heat exchanger containing vertical, heated, straight tubes having an internal diameter of 5 to 30 mm, a length of 0.2 to 2 m, and the throughput per heat-exchanger tube through the tubes being 0.5 to 10 kg/h based on the polymer, and the pressure in the separator being 0.05 kPa to 0.1 Mpa; and isolating the polymer; and optionally granulating the polymer.

2. The process according to claim 1, wherein the solvent is dichloromethane or a mixture of dichloromethane and chlorobenzene.

3. The process according to claims 1 or 2, wherein the filtration is carried out such that after the filtration, the foreign particle index in the polycarbonate obtained is less than $2.5 \cdot 10^4$ $\mu m^2/g$.

4. The process according to claims 1 or 2, wherein after the filtration, the sodium content is less than 50 ppb.

5. The process according to claims 1 or 2, wherein the polycarbonate obtained is processed to form a moulded product.

6. The polycarbonate produced by the process according to claim 1 having a molar mass of 12,000 to 40,000 and a foreign particle index of less than $2.5 \cdot 10^4$ $\mu m^2/g$.

7. The polycarbonate produced by the process according to claim 1 having a molar mass of 12,000 to 40,000 and a sodium content of less than 30 ppb.

8. The moulded product containing a polycarbonate made according to claims 6 or 7.

9. The moulded product according to claim 8, wherein the moulded product is part of a laser-readable optical or magneto-optical data storage medium.

10. The moulded product according to claim 8, wherein the moulded product is an optical lens or a prism.

11. The moulded product according to claim 8 further including a surface coating.

12. The moulded product according to claim 9 further including a surface coating.

13. The moulded product according to claim 10 further including a surface coating.

14. The process of claim 3, wherein the foreign particle index is less than $1.8 \cdot 10^4$ $\mu m^2/g$.

15. The process of claim 4, wherein the sodium content is $\leq 30$ ppb.

* * * * *